United States Patent
Chu

(10) Patent No.: US 6,272,170 B1
(45) Date of Patent: Aug. 7, 2001

(54) METHOD AND APPARATUS FOR REDUCING START-UP LATENCY IN A DATA TRANSMISSION SYSTEM

(75) Inventor: Keith T. Chu, Laguna Niguel, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/112,433

(22) Filed: Jul. 9, 1998

(51) Int. Cl.⁷ .................................................. H04B 1/38
(52) U.S. Cl. ............................................ 375/222; 375/225
(58) Field of Search ............................ 375/219, 222, 375/225, 257, 295; 455/557, 73; 358/435; 379/1, 90.01, 338, 414; 710/1

(56) References Cited

U.S. PATENT DOCUMENTS

| | | | |
|---|---|---|---|
| 5,509,050 | * | 4/1996 | Berland .............................. 455/557 |
| 5,812,281 | * | 9/1998 | Mukai et al. ..................... 358/435 |
| 5,903,603 | * | 5/1999 | Kennedy et al. ................. 375/222 |

FOREIGN PATENT DOCUMENTS

| | | |
|---|---|---|
| 0601260A1 | 6/1994 | (EP) . |
| 0711060A1 | 5/1996 | (EP) . |
| WO 97/49228 | 12/1997 | (WO) . |

* cited by examiner

*Primary Examiner*—Stephen Chin
*Assistant Examiner*—Chieh M. Fan
(74) *Attorney, Agent, or Firm*—Snell & Wilmer L.L.

(57) ABSTRACT

A modem system start-up routine is performed in an improved manner such that information related to the exchange of the operational capabilities of the modem devices is transmitted at a higher data rate than prior art systems. A transition protocol is utilized to enable the modem system to seamlessly shift operating modes during the start-up routine. An initial data rate is utilized to transmit initial capabilities exchange data near the beginning of the start-up routine. Next, an initial training procedure is conducted to train the receive modem for operation at an intermediate data rate. The exchange of operational capabilities occurs at this intermediate data rate. Eventually, the modem system shifts to the primary data rate utilized during the normal data transmission mode. A final training procedure is performed to tune the receive modem in a more precise manner in response to the primary data rate. The overall effect of the improved start-up routine is a reduction in the start-up latency time.

24 Claims, 2 Drawing Sheets

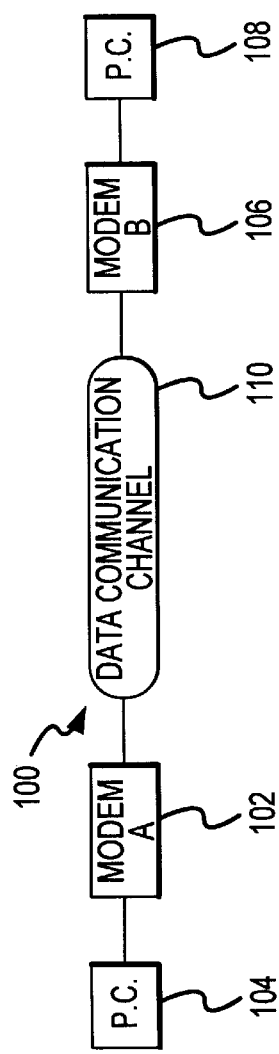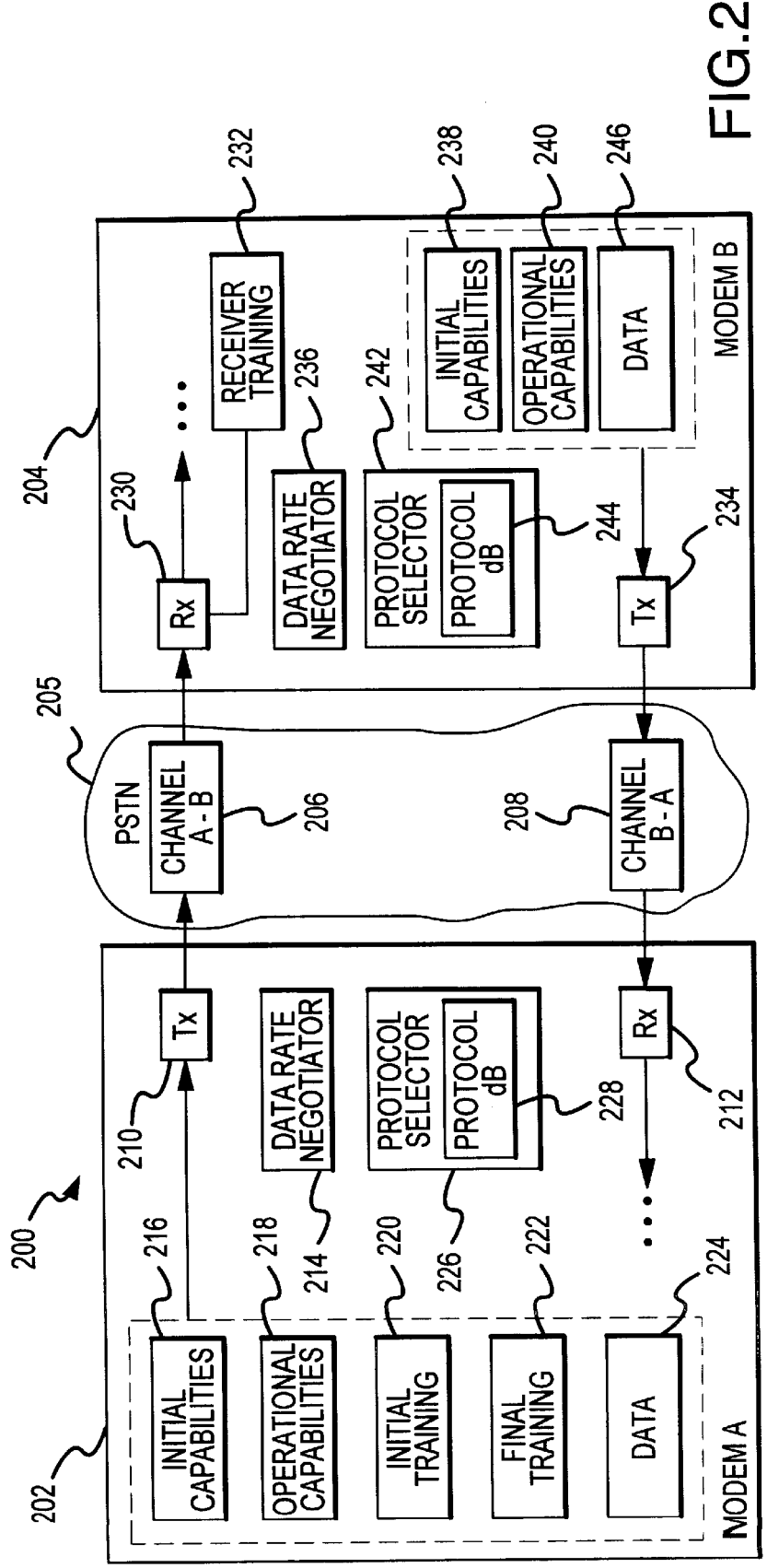

METHOD AND APPARATUS FOR
REDUCING START-UP LATENCY IN A DATA
TRANSMISSION SYSTEM

FIELD OF THE INVENTION

The present invention relates generally to data transmission systems, such as modem systems. More particularly, the present invention relates to start-up, training, and device capability exchange procedures associated with modem systems.

BACKGROUND OF THE INVENTION

Modem systems are widely used to communicate data over the public switched telephone network ("PSTN") and other telecommunication networks. A general block diagram of a typical modem system 100 is illustrated in FIG. 1. A first modem 102 may be operatively associated with any suitable data source, e.g., a first personal computer ("PC") 104. Similarly, a second modem 106 may be operatively associated with a second PC 108. Although not shown in FIG. 1, modem 102 or modem 106 may be integrated with PC 104 or PC 108, respectively.

When a data communication session is initiated, a data communication channel 110 is established between modems 102 and 106. Digital data from PC 104 may be processed by modem 102 in accordance with any number of well-known protocols, then transmitted over data communication channel 110 to modem 106. Upon receipt of the transmit signal, modem 106 processes the received signal to extract the original digital data, then presents the data to PC 108.

The broad functional overview set forth above applies to virtually all modem systems. However, the detailed operation of modem systems is often governed by national or international standards. For example, certain modem systems may be governed by ITU-T Recommendation V.O.34, published September 1994 ("V.O.34"), the entire content of which is hereby incorporated by reference. To ensure that individual modem devices are compatible with one another, V.O.34 specifies: transmission data rates; encoding and decoding techniques; signals and sequences utilized during start-up, training, and other modes; line probing methodologies; electrical characteristics; and other operating parameters.

Once a communication session is established between modem 102 and modem 106, the Phase 1 procedure set forth in V.O.34 is performed. The Phase 1 procedure generally relates to the identification and selection of operating features supported by modems 102 and 106; this procedure is often referred to as the modem capabilities exchange procedure. For example, different modem devices may be configured to operate in accordance with any number of standardized (but not mandatory) functional protocols. Prior to entering the data mode, the modem devices exchange and/or negotiate their operating capabilities and select one or more protocols to be followed during the current communication session. Phase 1 is governed by ITU-T Recommendation V.O.8, published 1994 ("V.O.8"), and ITU-T Recommendation V.O.8 bis, published August 1996 ("V.O.8 bis"). The entire contents of V.O.8 and V.O.8 bis are hereby incorporated by reference. V.O.8 bis dictates how modems 102 and 106 perform the identification and selection of operating protocols.

Following Phase 1, modems 102 and 106 enter Phase 2 to conduct line probing and ranging in accordance with V.O.34. The receiver associated with modem 106 is trained for optimized performance at the designated data rate during Phase 3. Phase 4, which follows the Phase 3 training, is performed to enable modems 102 and 106 to exchange data rates and modulation capabilities, e.g., the enabling of shaping, non-linear mapping, and trellis code type. After Phase 4 is complete, the modem system may enter the data transmission mode.

Due to the various start-up routines and procedures, an undesirably long time may pass between the initialization of the communication session and the beginning of the data mode. This delay (i.e., start-up latency) is due in part to the large amount of data transmission and processing that is performed during capabilities exchanging, training, and other V.O.34 start-up procedures. Furthermore, V.O.8 and/or V.O.8 bis is performed at a relatively slow data rate, e.g., 300 bps, rather than the relatively high data rates typically associated with the data mode. Accordingly, the exchange and processing of data during V.O.8 and V.O.8 bis has the side effect of delaying the data mode.

In prior art V.O.34 modem systems, the Phase 3 training is performed in response to the primary data rate selected for use during the data mode. Training the modem system at the primary data rate utilizes a relatively large number of training parameters designed to assess the line conditions and tune the equalizers resident at the receive modem, e.g., modem 106. In addition, training for the primary data rate may also be more prone to errors; redundant transmission of training sequences may be required to reduce the likelihood of such errors. As a result, the rather long sequences transmitted during conventional Phase 3 training may exacerbate the problem of start-up latency in the modem system.

SUMMARY OF THE INVENTION

Accordingly, it is an advantage of the present invention that an improved modem system is provided that has a reduced start-up latency time associated therewith.

Another advantage of the present invention is that information associated with the exchange of modem operating capabilities is transmitted at a relatively high data rate compared to prior art systems.

Another advantage is that information associated with the exchange of modem operating capabilities is transmitted after the training of the receive modem.

A further advantage of the present invention is that it provides a method for reducing the time required to perform the procedures set forth in V.O.8 bis.

Another advantage is that the modem system performs receiver training in two stages associated with different data rates to reduce the time required to effectively complete such training.

The above and other advantages of the present invention may be carried out in one form by a data transmission system having a first device and a second device, each being configured to communicate with one another over at least one communication channel, a transmitter configured to send initial capabilities exchange data at an initial data rate from the first device to the second device, and a rate negotiation element for changing the initial data rate to an intermediate data rate supported by the data transmission system. The transmitter is also configured to communicate operational capabilities data at the intermediate data rate from the first device to the second device.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIG. 1 is a block diagram depicting a general prior art modem system arrangement;

FIG. 2 is a block diagram of an exemplary modem system configured in accordance with the present invention.

DETAILED DESCRIPTION OF A PREFERRED EXEMPLARY EMBODIMENT

Figure 3:
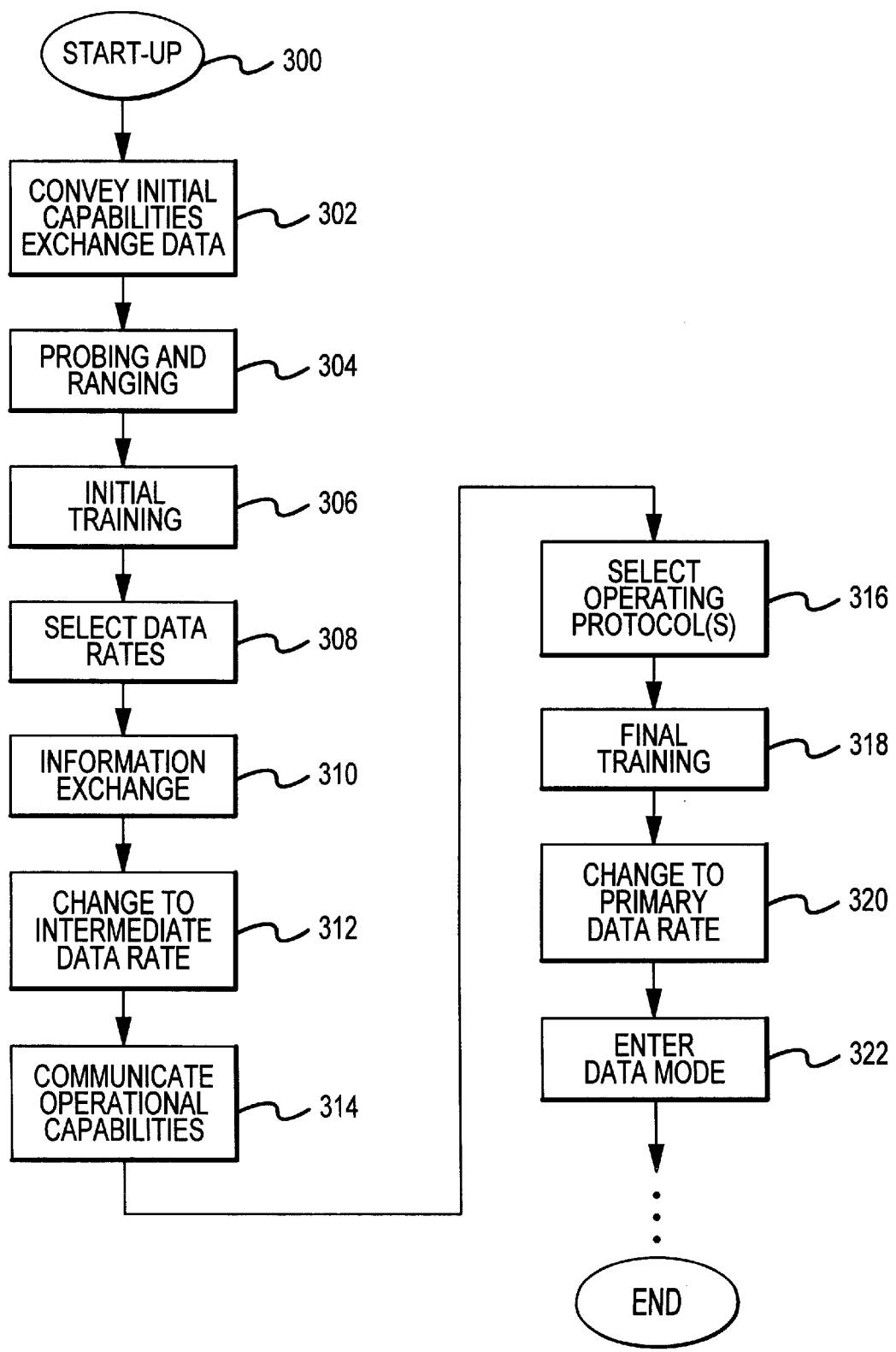
FIG. 3 is a flow diagram of an exemplary start-up process that may be performed by the modem system shown in FIG. 2.

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, control signaling, signal processing and conditioning, and the like. Such general techniques are known to those skilled in the art and will not be described in detail herein.

FIG. 2 is a block diagram depiction of an exemplary modem system 200 configured in accordance with the present invention. By way of example, modem system 200 may be described herein in the context of a VO.34 system (or a system substantially similar to a VO.34 system). However, it should be appreciated that the particular implementation shown in FIG. 2 and described herein is merely exemplary and is not intended to limit the scope of the present invention in any way. Indeed, for the sake of brevity, conventional encoding and decoding, timing recovery, automatic gain control (AGC), synchronization, training, and other functional aspects of modem system 200 may not be shown or described in detail herein. Furthermore, the connecting lines shown in FIG. 2 are intended to represent exemplary functional relationships and/or physical couplings between the various elements. Those skilled in the art will recognize that many alternative or additional functional relationships or physical connections may be present in a practical modem system.

Generally, modem system 200 includes a first modem, e.g., modem 202, and a second modem, e.g., modem 204. In the context of this description, modem 202 is considered to be the transmit modem and modem 204 is considered to be the receive modem. It should be appreciated that modems 202 and 204 may be similarly configured such that each can function in either a transmit or receive mode. Modems 202, 204 are generally configured in accordance with known principles to communicate over a telecommunication network, such as the public switched telephone network (PSTN) 205, via at least one communication channel (e.g., channels 206, 208). For the sake of clarity, FIG. 2 does not show the various encoder and decoder elements that would typically be present in a practical modem system.

Although not shown in FIG. 2, each of modems 202, 204 may include a suitable processor configured to carry out various tasks associated with the operation of modem system 200. Indeed, modem system 200 may incorporate any number of processors, control elements, and memory elements as necessary to support its operation. Such processor, control, and memory elements may suitably interact with other functional components of modems 202, 204 to thereby access and manipulate data or monitor and regulate the operation of modem system 200.

Modem 202 includes a transmitter 210, which is configured to transmit encoded symbols in accordance with conventional data transmission techniques. Such symbols may represent data, training signals, synchronization signals, control signals, information exchange signals, and the like. Modem 202 also includes a receiver 212, which is preferably configured in accordance with conventional modem technologies. Receiver 212 is configured to receive data from modem 204; such data may include encoded information bits, control signals, functional parameters or identifiers, and any other data employed by conventional modem systems.

Modem 202 preferably includes a data rate negotiator 214 configured to select and/or change the transmit data rate associated with a given data communication session. The specific data rate(s) supported by modem system 200 may be determined for each communication session during an initialization or start-up procedure. During the communication session, data rate negotiator 214 may be responsive to various control or timing signals generated by modem 202 or modem 204. Data rate negotiator 214 may be employed to alter the current data rate such that certain standard operating protocols may be followed during control signaling, initial and subsequent capabilities exchanging, training, and other procedures associated with modem system 200. For example, in the preferred embodiment, a relatively low initial data rate is used during initial and/or essential capability negotiation, an intermediate data rate is used to provide coarse modem training and to complete the capability indication and mode selection, and a primary data rate is used during the actual data mode. Those skilled in the art will recognize that any number of conventional rate negotiation techniques may be utilized by data rate negotiator 214.

Modem 202 is preferably configured to generate, process, and transmit different data and signals associated with the operation of VO.34 modem systems. Such data and signals may be suitably stored, formatted, and generated by any number of microprocessor-controlled components. For illustrative purposes, FIG. 2 depicts a number of blocks related to different operational features of modem system 200; such operational features may have specific data sequences, control signals, or the like, associated therewith. Although a practical system may include any number of additional or alternative functional blocks, the particular embodiment described herein includes at least an initial capabilities block 216, an operational capabilities block 218, an initial training block 220, a final training block 222, and a data mode block 224.

Initial capabilities block 216 is associated with a portion of the conventional start-up signals and sequences defined in VO.8 and VO.8 bis. The data and sequences associated with initial capabilities block 216 are preferably transmitted immediately following a call from modem 202 to modem 204. Referring to VO.34, all capabilities negotiation and exchange procedures are performed during Phase 1 of the start-up routine. Unlike conventional VO.34 modem systems, and as described in more detail below, modem system 200 may perform different portions of the Phase 1 functions during different time segments. For example, essential capabilities that are necessary early in the start-up procedure are preferably exchanged during Phase 1 at the relatively low data rate, while optional or remaining transactions may be performed later at the intermediate data rate.

As stated above, conventional VO.34 modem systems perform the VO.8 and VO.8 bis procedures during the Phase 1 of the start-up routine. In contrast, modem system 200 "divides" portions of the VO.8 and VO.8 bis procedures such that the exchange of some operational characteristics is performed after the completion of the Phase 1 start-up. The temporal separation of this procedure enables modem system 200 to experience reduced start-up latency times, relative to conventional VO.34 systems, by conducting the capabilities exchange routine at a higher data rate than that called for by VO.8 and VO.8 bis. Accordingly, operational capabilities block 218 is preferably associated with sequences and signals that are utilized by modems 202 and 204 to exchange their operating capabilities with one another at a different data rate than the sequences and signals associated with initial capabilities block 216.

It should be noted that, for purposes of this description, the capabilities negotiation and exchange procedure has been divided into an "initial" capabilities procedure and an "operational" capabilities procedure. These designations are merely employed to conveniently distinguish the temporal order and/or the different data rates associated with these two subprocesses, rather than the characteristics or format of the information transmitted or processed in connection with initial capabilities block 216 and operational capabilities block 218.

The exchange of capabilities is especially desirable when any given individual modem may function in a number of different operating modes. For example, a specific modem device may be capable of operating as a data modem, a fax modem, a simultaneous data/voice modem, a multimedia terminal, or the like. In addition to the general operating modes supported by modems 202 and 204, initial capabilities block 216 and/or operational capabilities block 218 may be utilized to enable modems 202 and 204 to specify the particular operating protocols related to the selected operating mode.

Modem 202 may include a protocol selector 226 configured to select at least one operating protocol compatible with modems 202 and 204. As shown in FIG. 2, protocol selector 226 may access a protocol database 228 that indicates the different operating modes and functional protocols supported by modem 202. Thus, in response to interrogation data (used to determine the operational capabilities of modem 204) exchanged between modems 202 and 204, protocol selector 226 may designate a certain number of protocols in database 228 for use during the current communication session.

Initial training block 220 represents the generation and processing of initial training sequences by modem 202. Initial training of modem system 200 (e.g., the adaptive equalization of receivers) is preferably conducted in response to an intermediate data rate that is lower than the highest primary data supported by modem system 200. As mentioned above, the intermediate and primary data rates may be predetermined by modem system 200 during the start-up routine. The initial training of modem system 200 may be desirable to enable modem system 200 to initially connect at the intermediate data rate rather than the primary data rate. The relatively lower intermediate data rate enables modem system 200 to be quickly tuned in a "rough" manner that does not require the processing of a large number of training parameters. Training in response to the intermediate data rate is desirable because such training is less prone to errors and is more robust in nature. Thus, modem system 200 can establish a working connection in a reduced amount of time.

Secondary training block 222 represents the generation and processing of secondary or subsequent training sequences by modem 202. In contrast to the initial training procedure described previously, the secondary training procedure is conducted in response to the relatively higher primary data rate selected for the current communication session. At this stage of the start-up routine, "precise" tuning of modem system 200 is performed to optimize performance at the primary data rate. The use of two training stages results in an overall time savings when compared to conventional training processes that are solely intended to tune the modem system for the primary data rate.

After modem system 200 has been adequately trained, it may be prompted to enter the data transmission mode. Data mode block 224 represents the data which is to be transmitted from modem 202 to modem 204 during the data mode. As described above, the data may be suitably encoded in accordance with conventional data encoding techniques, e.g., those set forth in VO.34. The data exchanged between modems 202 and 204 is transmitted at the previously-established primary data rate.

With continued reference to FIG. 2, signals transmitted to modem 204 over channel 206 are received by a receiver 230. It should be noted that receiver 230 may include any number of additional components (that may be known in the art) for decoding, equalization, conditioning, or other processing of the received signal. Modem 204 processes received signals to obtain the original digital data encoded by modem 202; modem 204 includes a decoder (not shown) configured to suitably decode the received symbols in accordance with the same encoding scheme employed by modem 202.

Modem 204 may include a receiver training element 232 that controls and regulates training procedures within modem 204. As shown in FIG. 2, receiver training element 232 may be associated with receiver 230 to enable the adaptive equalization of receiver 230 in response to one or more training sequences sent by modem 202. As described above and in more detail below, receiver training element 232 is preferably configured to facilitate "multiple stage" training of receiver 230.

A transmitter 234 is preferably utilized to send data from modem 204 to modem 202. In addition to conventional signaling and control information, such data may include information related to data rate negotiation, call establishment protocols, or the operating modes and capabilities of modem 204. In the preferred embodiment, the information transmitted by transmitter 234 is encoded prior to transmission over PSTN 205.

Modem 204 may also include a data rate negotiator 236, an initial capabilities functional element 238, an operational capabilities functional element 240, a protocol selector 242, a protocol database 244, and a data mode functional element 246. These elements are analogous to the corresponding elements described above in connection with modem 202. When modem 204 is functioning as the receive modem, the functional elements related to the generation and transmission of training signals need not be employed.

The principles of the present invention may be employed by modem system 200 to reduce the start-up latentcy normally associated with conventional VO.34 modem systems. Tables 1–2 generally illustrates the differences between the conventional VO.34 start-up methodology and an exemplary start-up methodology according to the present invention.

TABLE 1

V.34 Start-Up Procedure

| Phase | Operation | Data Rate |
|---|---|---|
| 1 | Capabilities Exchange | Initial |
| 2 | Probing and Ranging | N/A |
| 3 | Training | N/A |
| 4 | Information Exchange | N/A |
| N/A | Data Transmission | Primary |

TABLE 2

Improved Start-Up Procedure

| "Phase" | Operation | Data Rate |
|---|---|---|
| 1 | Initial Capabilities Exchange | Initial |
| 2 | Probing and Ranging | N/A |
| 3 | Initial Training (Rate 1) | N/A |
| 4 | Information Exchange | N/A |
| 1' | Capabilities Exchange | Intermediate |
| 3' | Secondary Training (Rate 2) | N/A |
| N/A | Data Transmission | Primary |

At least two aspects of the present invention contribute to the reduction in conventional VO.34 start-up latentcy times: the transmission of a portion of the capabilities exchange information at a higher data rate, and the use of an initial training segment associated with an intermediate data rate followed by a secondary training segment associated with the primary data rate. Either or both of these features of the present invention may be implemented in modem system 200.

FIG. 3 is a flow diagram of an exemplary start-up process 300 that may be performed by modem system 200. In this particular embodiment, process 300 is generally based upon the conventional VO.34 start-up procedures. However, process 300 may be suitably modified for operation in the context of any modem system, and the present invention is not limited to any specific start-up protocol. Furthermore, any number of additional or alternative tasks may be implemented by modem system 200, and the tasks associated with process 300 need not necessarily be performed in the order shown in FIG. 3.

Start-up process 300 begins with a task 302, which is performed to convey initial capabilities exchange data between modems 202 and 204. In the context of this description, "initial capabilities exchange data" is that capabilities data which may be considered to be essential or necessary for purposes of continued operation of modem system 200. In the preferred embodiment, task 302 conveys the initial capabilities exchange data in accordance with VO.8 and VO.8 bis. The initial capabilities exchange data is transmitted at an initial data rate, e.g., 300 bps (as set forth in VO.8 and VO.8 bis). The initial data rate is substantially lower than the primary data rate typically utilized by current modem systems; such primary data rates routinely exceed 14.4 kbps, especially in VO.34 modem systems. Task 302 differs from the VO.34 start-up procedure in that all of the operational capabilities of modems 202 and 204 are not exchanged at the initial data rate. The exchange of the remaining operational capabilities is described in more detail below.

Following task 302, a task 304 may be performed to prompt modem system 200 to initiate a line probing and ranging procedure. Task 304 may employ any number of known techniques to suitably test the characteristics of channels 206 and/or 208 (see FIG. 2). For example, task 304 may be utilized to identify line impairments and transmission noise levels. Task 304 may correspond to Phase 2 of the VO.34 start-up procedure.

Next, a task 306 is performed to cause modem system 200 to conduct an initial training procedure. The initial training procedure preferably tunes modem 204 in response to at least one training sequence transmitted from modem 202 to modem 204. This initial training procedure may be performed to obtain a data rate that differs from the primary data rate; in the preferred embodiment, the initial training procedure is performed to obtain the highest practical intermediate data rate in the allocated training time. For example, a specific initial training interval may be predetermined such that the start-up latency time is effectively reduced. Then, the particular training procedure and/or training sequence is selected to optimize the initial training procedure (considering the current line conditions, the tolerable error rate, and the like). Alternatively, a particular intermediate data rate may be designated such that the initial training procedure is performed in response to the intermediate data rate. In such an alternate embodiment, the time interval associated with task 306 may vary in accordance with the particular intermediate data rate.

Furthermore, due to the relatively low intermediate data rate, the initial training need not include redundant transmissions to compensate for errors. Modem system 200 is therefore able to support operation at the intermediate data rate, during which additional training information related to the primary data rate may be obtained. As described above, the initial training procedure performed during task 306 may be performed in an efficient and effective manner because it is less error prone, relative to conventional training procedures. In addition, the number of training parameters and repeated segments are reduced when training for the intermediate data rate rather than the primary data rate.

A task 308 may be performed to suitably select one or more data rates to be utilized by modem system 200. In the preferred embodiment, task 308 selects at least a primary data rate associated with a data mode supported by modem system 200 and an intermediate data rate that is less than the primary data rate and greater than the initial data rate. For example, where the primary data rate is selected to be 26.4 kbps, an intermediate data rate may be selected at 19.2 kbps. The significance of the intermediate data rate is explained in more detail below. The data rates may be selected in response to the line probing results obtained during task 304 and/or in response to the initial training performed during task 306. It should be noted that task 308 may also correspond to Phase 2 of the VO.34 start-up procedure.

A task 310 may be performed to cause modems 202 and 204 to exchange modulation information associated with the "physical" attributes of the modulation scheme. Such information may include the selected data rates and other information utilized by modem system 200. During task 310, modems 202 and 204 may communicate information related to the enabling of spectral shaping, non-linear mapping, the trellis code type, and the like. Task 310 may be likened to Phase 4 of the VO.34 start-up procedure.

Some time after the initial training is complete, a task 312 is performed to cause modem system 200 to change to operation at the intermediate data rate. The shift to the intermediate rate may be facilitated by a suitable "transition" protocol that enables a seamless transfer from one set of operating parameters to another. One such transition protocol is described in a United States patent application by the present inventor entitled "Method for Implementing an Inband Capabilities Negotiation" (Ser. No. 09/086,617 filed May 27, 1998). The entire content of this patent application is incorporated by reference herein. This transition protocol may be suitable for purposes of the present invention to facilitate the changing of data rates and exchange of information between modems 202 and 204 during start-up process 300.

Once modem system 200 is operating at the intermediate data rate, a task 314 may be performed to communicate further capabilities information between modems 202 and 204 at the intermediate data rate. As described above, any given modem device may be capable of supporting a plurality of operating modes, e.g., data, simultaneous voice and data, fax, or the like. In practice, modems 202 and 204 exchange data indicative of their respective capabilities to establish their compatibility with one another. As shown in FIG. 3, task 314 is preferably performed after the initial training of task 308.

In prior art VO.34 modem systems, the exchange of all operational capabilities information is performed at the beginning of the start-up routine at a data rate of only 300 bps; VO.8 bis governs the exchange of operational capabilities in such systems. In contrast to prior art modem systems, start-up process 300 performs the exchange of nonessential or optional operational capabilities at a much higher data rate, e.g., the intermediate rate. Consequently, the overall start-up latency time associated with modem system 200 is effectively reduced without sacrificing performance.

In response to the exchange of operational capabilities, a task 316 may be performed to suitably select at least one operating protocol compatible with modems 202 and 204. For example, modems 202 and 204 may eventually identify which operating modes and protocols are mutually supported and select those which are to govern the current communication session. As shown in FIG. 2, modems 202 and 204 may maintain a suitable protocol database that may be accessed or interrogated during task 316.

Subsequent to the initial training (task 308), a task 318 may be performed to cause modem system 200 to enter a final training mode. The final training is preferably performed in response to one or more final training sequences transmitted between modems 202 and 204. The final training procedure is performed in accordance with the primary data rate. Thus, after being tuned in a "rough" manner for the intermediate data rate, modem 204 is subsequently tuned for eventual operation at the primary data rate. This subsequent training procedure need not be as rigorous as conventional VO.34 training due to the initial training performed during task 308. It should be noted that tasks 316 and 318 may be performed concurrently in a practical system.

Eventually, modem system 200 performs a task 320 to shift to the primary data rate. Modem system 200 may utilize a suitable transition protocol (described above) during task 320. As shown in FIG. 3, the change to the primary data rate preferably occurs after the operational capabilities are exchanged at the intermediate data rate. Once modem system 200 is transmitting at the primary data rate, it may enter a data mode to carry out data transmission in accordance with conventional methodologies.

A modem system following the principles of the present invention will experience an overall reduction in start-up latency, even though one or more additional "phases" may be required. For international standardization and implementation of the present invention, VO.8 bis may need to be modified such that it can recognize the existence of the transitional protocol and establish the capabilities and procedures associated with start-up process 300. In addition, portions of VO.34 may require modification to facilitate the multiple-stage training described above.

In summary, the present invention provides an improved modem system that operates with a reduced start-up latency time. In the improved modem system, information associated with the exchange of modem operating capabilities is transmitted at a relatively high data rate compared to prior art systems. The information associated with the exchange of modem operating capabilities is transmitted after the initial training of the receive modem. Such preferred transmission of the operating capabilities enables a practical modem system to perform portions of the conventional VO.8 bis procedures in a time efficient manner. In addition, the modem system performs receiver training in at least two stages associated with different data rates to reduce the time required to effectively complete such training.

The present invention has been described above with reference to a preferred embodiment. However, those skilled in the art will recognize that changes and modifications may be made to the preferred embodiment without departing from the scope of the present invention. For example, although the exemplary modem system described herein is based upon a VO.34 system, the principles of the present invention may be extended to any number of different modem systems. In addition, the processes and tasks described herein may be performed by different hardware or software based components than those described herein. These and other changes or modifications are intended to be included within the scope of the present invention, as expressed in the following claims.

What is claimed is:

1. A method for reducing start-up latency associated with a data transmission system having a first device configured to communicate with a second device over at least one communication channel, said method comprising the steps of:

training said data transmission system in response to a training sequence transmitted between said first device and said second device, said training step obtaining a data rate less than a primary data rate associated with a data mode supported by said data transmission system;

communicating, at an intermediate data rate between said first device and said second device, data indicative of operational capabilities of said first device and said second device, said communicating step being performed after said training step; and changing said intermediate data rate to said primary data rate, said changing being performed after said communicating step.

2. A method according to claim 1, further comprising the step of selecting said intermediate data rate and said primary data rate, said selecting step being performed after said training step.

3. A method according to claim 1, wherein said training step obtains said data rate within a predetermined training time interval.

4. A method according to claim 1, wherein said training step is performed in response to said intermediate data rate.

5. A method according to claim 1, further comprising the step of subsequently training said data transmission system in response to a subsequent training sequence transmitted between said first device and said second device, said subsequent training step being performed in accordance with said primary data rate.

6. A method according to claim 5, wherein said subsequent training step is performed in response to said primary data rate.

7. A method according to claim 1, further comprising the step of conveying initial capabilities exchange data between said first device and said second device, said sending step being performed before said training step.

8. A method according to claim 7, wherein said sending step is performed at an initial data rate lower than said intermediate data rate.

9. A method according to claim 7, further comprising the step of selecting at least one operating protocol compatible with said first device and said second device, said selecting step being performed in accordance with said data indicative of operational capabilities of said first device and said second device.

10. A method for reducing start-up latency associated with a data transmission system having a first device configured to communicate with a second device over at least one communication channel, said method comprising the steps of:

conveying initial capabilities exchange data at an initial data rate between said first device and said second device;

changing said initial data rate to an intermediate data rate supported by said data transmission system; and communicating, at an intermediate data rate between said first device and said second device, data indicative of operational capabilities of said first device and said second device, said communicating step being performed after said changing step.

11. A method according to claim 10, further comprising the step of selecting said intermediate data rate, said selecting step being performed before said changing step.

12. A method according to claim 10, wherein said changing step changes said initial data rate to an intermediate data rate higher than said initial data rate.

13. A method according to claim 10, further comprising the step of training said data transmission system in response to a training sequence transmitted between said first device and said second device, said training step being performed before said changing step.

14. A method according to claim 13, wherein said training step is performed to obtain said intermediate data rate.

15. A method according to claim 10, further comprising the step of altering said intermediate data rate to a primary data rate associated with a data mode supported by said data transmission system, said altering step being performed after said communicating step.

16. A method according to claim 15, further comprising the step of subsequently training said data transmission system in response to a subsequent training sequence transmitted between said first device and said second device, said subsequent training step being performed after said altering step.

17. A method according to claim 15, wherein said altering step alters said intermediate data rate to a primary data rate higher than said intermediate data rate.

18. A data transmission system comprising:

a first device and a second device, each being configured to communicate with one another over at least one communication channel;

means for sending initial capabilities exchange data at an initial data rate from said first device to said second device;

means for changing said initial data rate to an intermediate data rate supported by said data transmission system; and means for communicating operational capabilities data at said intermediate data rate from said first device to said second device.

19. A data transmission system according to claim 18, wherein said means for sending comprises a transmitter resident at said first device.

20. A data transmission system according to claim 19, wherein said means for communicating comprises said transmitter.

21. A data transmission system according to claim 18, wherein said first device further comprises means for generating a training sequence formatted for training said second device for operation at said intermediate data rate.

22. A data transmission system according to claim 21, wherein said means for generating is further configured to generate a subsequent training sequence formatted for subsequently training said second device for operation at said primary data rate.

23. A data transmission system according to claim 18, wherein said means for changing is further configured to change said intermediate data rate to a primary data rate associated with a data mode supported by said data transmission system.

24. A data transmission system according to claim 18, wherein said means for sending sends initial capabilities exchange data in accordance with ITU-T Recommendations VO.8 and VO.8 bis.

* * * * *